(12) United States Patent
Schwartz et al.

(10) Patent No.: US 9,563,404 B2
(45) Date of Patent: Feb. 7, 2017

(54) INSTALLING SOFTWARE USING A SET OF CHARACTERISTICS AND A TASK LIST

(75) Inventors: Daniel Schwartz, San Francisco, CA (US); Arin Bhowmick, Fremont, CA (US); Harris Kravatz, Danville, CA (US); Michael Remington, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 327 days.

(21) Appl. No.: 13/234,382

(22) Filed: Sep. 16, 2011

(65) Prior Publication Data
US 2013/0074063 A1  Mar. 21, 2013

(51) Int. Cl.
*G06Q 10/00* (2012.01)
*G06F 9/445* (2006.01)
*G06F 9/44* (2006.01)
*G06Q 10/06* (2012.01)

(52) U.S. Cl.
CPC . *G06F 8/10* (2013.01); *G06F 8/61* (2013.01); *G06Q 10/06311* (2013.01); *G06Q 10/0631* (2013.01)

(58) Field of Classification Search
CPC .............. G06F 8/60–8/71; G06F 9/445; G06F 9/44505; G06F 9/4451; G06Q 10/06; G06Q 10/063; G06Q 10/0631; G06Q 10/06311
USPC .................................. 705/7.13; 717/168–178
See application file for complete search history.

(56) References Cited

U.S. PATENT DOCUMENTS

| 5,999,911 A * | 12/1999 | Berg .................... G06F 17/50 705/7.13 |
| 6,182,285 B1 * | 1/2001 | Bleizeffer et al. ............ 717/170 |
| 6,744,450 B1 * | 6/2004 | Zimniewicz .............. G06F 8/61 717/168 |
| 7,185,334 B2 * | 2/2007 | Bourke-Dunphy et al. .. 717/174 |
| 7,721,259 B2 * | 5/2010 | Heinke et al. ................ 717/121 |
| 7,971,202 B2 * | 6/2011 | Bell et al. ..................... 717/172 |
| 8,156,489 B2 * | 4/2012 | Kane ............................ 717/176 |
| 8,484,355 B1 * | 7/2013 | Lochhead et al. ............ 709/226 |
| 8,706,768 B2 * | 4/2014 | Motoyama ............. G06Q 10/06 707/796 |

(Continued)

OTHER PUBLICATIONS

Author Unknown, "TurboTax® Tax Preparation Software," accessed Dec. 19, 2011 from http://turbotax.intuit.com/, Copyright 1997-2011 Intuit Inc., 2 pages.

*Primary Examiner* — Emerson Puente
*Assistant Examiner* — Erika Kretzmer
(74) *Attorney, Agent, or Firm* — Kilpatrick Townsend & Stockton LLP

(57) ABSTRACT

A set of characteristics is received in response to a questionnaire. Using the characteristics, various tasks are identified as requiring or not requiring user input because of the applicability to the customer. An associated task owner is determined for a subset of tasks. In response to receiving a selection of a selectable dependency indication associated with a first task, displaying task dependency data associated with the first task is displayed, the task dependency data including a set of tasks on which the first task depends for completion, a set of tasks that depend on the first task for completion, and for each of these dependent tasks, an associated task owner and a task status. A task list that indicates tasks needing to be completed is presented to the user. Software is installed according to the task list.

20 Claims, 16 Drawing Sheets

(56) References Cited

U.S. PATENT DOCUMENTS

| | | | | |
|---|---|---|---|---|
| 8,713,527 B2* | 4/2014 | Frontiero | ............... | G06F 8/71 |
| | | | | 717/120 |
| 8,762,944 B2* | 6/2014 | Frontiero | ............... | G06F 8/71 |
| | | | | 717/120 |
| 8,832,651 B2* | 9/2014 | Kibbar | ............. | G06F 9/44505 |
| | | | | 717/170 |
| 2004/0015955 A1* | 1/2004 | Bourke-Dunphy et al. | .. | 717/174 |
| 2005/0262503 A1* | 11/2005 | Kane | ...................... | 717/176 |
| 2007/0168962 A1* | 7/2007 | Heinke et al. | ............. | 717/120 |
| 2007/0220510 A1* | 9/2007 | Bell et al. | ................... | 717/174 |
| 2007/0240150 A1* | 10/2007 | Gangwar et al. | ............ | 717/174 |
| 2007/0271552 A1* | 11/2007 | Pulley | ......................... | 717/120 |
| 2008/0244563 A1* | 10/2008 | Sonkin et al. | ............... | 717/175 |
| 2009/0287730 A1* | 11/2009 | Motoyama | ............ | G06Q 10/06 |
| | | | | 707/999.102 |
| 2011/0246976 A1* | 10/2011 | Kibbar | ........................ | 717/170 |
| 2012/0246616 A1* | 9/2012 | Frontiero et al. | ............. | 717/121 |
| 2012/0246617 A1* | 9/2012 | Frontiero et al. | ............. | 717/122 |

* cited by examiner

Collections Task Generator: Operations

Operations — Transactions — Collections Methods — Review

Next | Save | Cancel

General Collections Information

310

Which of the following does your organization collect?

320
☑ Delinquent receivables
☑ Loans
☐ Lease contracts

At what level does your organization do business with customers?

○ Account
○ Bill to
○ Customer
● Delinquency

Display Preference

Do you want to review the display settings? Yes ▼

Correspondance

Do you send correspondance to your customer? Yes ▼

Collections Setup

The table below contains a set of tasks to help you setup, deploy and maintain your Product Suite.

| Task | Go to Task | Status | View Dependencies | Last Updated |
|---|---|---|---|---|
| ⊟ Operations | | | | |
| Define General Collections | 🏠 | ■ | | |
| Set Display Preferences | 🏠 | ■ | | |
| Set up Correspondence | 🏠 | ■ | | |
| ⊟ Transactions | | | | |
| * Configure Transaction | 🏠 | 🕐 | 📄 | 11-Jul-2006 |
| * Configure Metrics | 🏠 | 🕐 | | 11-Jul-2006 |
| ⊟ Collections Method | | | | |
| Select Scoring Components | 🏠 | ■ | | |
| Create Scoring Engine | 🏠 | ■ | | |
| * Create Work Items | 🏠 | ■ | 📄 | |
| Create Collections Strategies | 🏠 | ■ | 📄 | |
| Define Strategy Defaults | 🏠 | ■ | | |

FIG. 5

Collections Task Generator: Review

Back | Save | ▼ | Submit | Cancel

Operations — Transactions — Collection Methods — Review

Please review that the following information is correct before submitting.

☐ Setup Task List

Based on your task generator selections, a setup task list will be generated with the following modifications:

610 — Task Created 2  Tasks Not Changed 3
Tasks Changed 1

620

| Task | Action |
|---|---|
| ☐ Operations | |
| Define General Collections | Changed |
| Set Display Preferences | Created |
| Set up Correspondence | Changed |
| ☐ Transactions | |
| * Configure Transaction | Not Changed |
| * Configure Metrics | Changed |
| ☐ Collections Method | |
| Select Scoring Components | Not Changed |
| Create Scoring Engine | Not Changed |
| * Create Work Items | Changed |
| Create Collections Strategies | Created |
| Define Strategy Defaults | Not Changed |

☐ Define General Collections: Task Details ⓘ

Impact General Data applying to all organizations

630

| Attribute | Current Value | New Value |
|---|---|---|
| Name | Michael Keane | n/a |
| Description | ACME Corporation Collections | n/a |
| Work Type | Automatic | Manual |

Collections Setup

The table below contains a set of tools to help you configure, deploy and maintain your Product Suite.

Actions  View  |  ☐  |  Edit Task Generator

| Task | Go to Task | Status | Approval Status | View Dependencies | Last Updated |
|---|---|---|---|---|---|
| ⊟ Operations | | | | | |
|   Define General Collections | 🏠 | ■ | | | |
|   Set Display Preferences | 🏠 | ■ | | | |
|   Set up Correspondence | 🏠 | ■ | | | |
| ⊟ Transactions | | | | | |
|   * Configure Transaction | 🏠 | ✓ | | | 10-Jul-2006 |
|   * Configure Metrics | 🏠 | ⌚ | | 🗂 | 11-Jul-2006 |
| ⊟ Collections Method | | | | | |
|   Select Scoring Components | 🏠 | ■ | | | |
|   Create Scoring Engine | 🏠 | ■ | | | |
|   * Create Work Items | 🏠 | ■ | | | |
|   Create Collections Strategies | 🏠 | ■ | Approval Required | 🗂 | |
|   Define Strategy Defaults | 🏠 | ■ | | 🗂 | |

Collections Setup
The table below contains a set of tools to help you configure, deploy and maintain your Product Suite.

Actions   View   ☐   |   Assign

| Task | Go to Task | Status | View Dependencies | Owner | Last Updated |
|---|---|---|---|---|---|
| ⊟ Operations | | | | | |
| Define General Collections | 🏠 | ▪ | | John Smith | |
| Set Display Preferences | 🏠 | ▪ | | John Smith | |
| Set up Correspondence | ⇧ | ▪ | | John Smith | |
| ⊟ Transactions | | | | | |
| * Configure Transaction | 🔒 | ⏱ | | Tina Johnson | 10-Jul-2006 |
| * Configure Metrics  1030 | 🔒 | ▪ | 🖿 | Tina Johnson | 11-Jul-2006 |
| ⊟ Collections Method | | | | | |
| Select Scoring Components | 🏠 | ▪ | | John Smith | |
| Create Scoring Engine | 🏠 | ▪ | 🖿 | John Smith | |
| * Create Work Items | ⇧ | ▪ | | John Smith | |
| Create Collections Strategies | 🏠 | ▪ | | John Smith | |
| Define Strategy Defaults | 🏠 | ▪ | | John Smith | |

FIG. 10

Collections Setup
The table below contains a set of tools to help you configure, deploy and maintain your Product Suite.

Actions ▾ | View | ☐ | Import All Task Settings ▾ | Export All Task Settings ▾

1130

| Task | Import All Task Settings | Export All Task Settings | Last Updated |
|---|---|---|---|
| | Import Selected Task Settings | Export Selected Task Settings | |
| ⊟ Operations | | | |
| Define General Collections | 🏠🏠 | ■ | |
| Set Display Preferences | 🏠 | ■ | |
| Set up Correspondence | ⇧ | ■ | |
| ⊟ Transactions | | | |
| * Configure Transaction | 🏠🏠 | ✓ | 10-Jul-2006 |
| * Configure Metrics | 🏠 | 🕐 | 11-Jul-2006 |
| ⊟ Collections Method | | | |
| Select Scoring Components | 🏠🏠 | ■ | |
| Create Scoring Engine | 🏠⇧ | ■ | |
| * Create Work Items | 🏠🏠 | ■ | |
| Create Collections Strategies ⋮ | 🏠 | ■ | |
| Define Strategy Defaults | 🏠 | ■ | |

INSTALLING SOFTWARE USING A SET OF CHARACTERISTICS AND A TASK LIST

BACKGROUND

Setting up, installing, and/or configuring enterprise software can be a time-consuming, repetitive, expensive, and/or complicated endeavor. The installation, setup and/or configuration of an enterprise software product, such as enterprise resource planning software, may vary significantly depending on the customer's (software operator's) business. For example, a mining company may require a significantly differently configured version of the same piece of enterprise software than a telecommunications company. As such, enterprise software, possibly before the enterprise software can be deployed for a particular customer, may require a user to perform significant set up, which may result in missing and/or incorrect information being used for setup and/or configuration, lost productivity, and/or delayed deployment of the enterprise software. Previous enterprise software setup solutions may not allow for effective collection and management of the information needed for efficient setup and/or configuration of enterprise software.

BRIEF SUMMARY

Various systems, methods, and software is described for setting up enterprise software. In some embodiments, a method for setting up enterprise software is described. The method may include receiving, by a computer system, a set of business characteristics in response to a questionnaire. The method may include analyzing, by the computer system, the set of business characteristics. The method may include determining, by the computer system, at least partially based on the set of business characteristics, a first subset of tasks of a task list not requiring user input, wherein each task of the task list comprises one or more data gathering steps for enterprise software. The method may include determining, by the computer system, at least partially based on the set of business characteristics, a second subset of tasks of the task list requiring user input. The method may include generating, by the computer system, the task list for display that indicates the second subset of tasks of the task list. Each task of the second subset of tasks of the task list may require information that cannot be determined based on the set of business characteristics. The method may include presenting, by the computer system, the task list.

Various embodiments may include one or more of the following: Tasks of the second subset of tasks may be configured to be completed in varying orders. The task list may comprise at least a portion of the first subset of tasks. At least the portion of the first subset of tasks may be graphically indicated as not requiring further information. The task list may be linked with a product suite. A first task of the second subset of tasks may be linked with setup for a first product of the product suite. A second task of the second subset of tasks may be linked with setup for a second product of the product suite. The task list may be linked with a product group. A first task of the second subset of tasks may be linked with setup for a first product suite of the product group. A second task of the second subset of tasks may be linked with setup for a second product suite of the product group. Displaying the task list may comprise graphically indicating at least one task of the second subset of tasks as completed. Displaying the task list may comprise graphically indicating at least one task of the second subset of tasks as dependent on information gathered for another task. The method may include following generating the task list that indicates the second subset of tasks to be completed, receiving, by the computer system, modifications to the set of business characteristics, thereby generating a modified set of business characteristics. The method may include analyzing, by the computer system, the modified set of business characteristics. The method may include determining, by the computer system, at least partially based on the modified set of business characteristics, a third subset of tasks of the task list not requiring user input. The method may include determining, by the computer system, at least partially based on the modified set of business characteristics, a fourth subset of tasks of the task list requiring user input. The method may include displaying, by the computer system, indications of changed, unchanged, added and deleted tasks from the second subset of tasks to the fourth subset of tasks.

In some embodiments, a computer program product residing on a non-transitory processor-readable medium and comprising processor-readable instructions is presented. The processor-readable instructions may be configured to cause a processor to receive a set of business characteristics in response to a questionnaire. The processor-readable instructions may be configured to cause the processor to analyze the set of business characteristics. The processor-readable instructions may be configured to cause the processor to determine, at least partially based on the set of business characteristics, a first subset of tasks of a task list not requiring user input, wherein each task of the task list comprises one or more data gathering steps for enterprise software. The processor-readable instructions may be configured to cause the processor to determine, at least partially based on the set of business characteristics, a second subset of tasks of the task list requiring user input. The processor-readable instructions may be configured to cause the processor to generate a task list for display that indicates the second subset of tasks. Each task of the second subset of tasks may require information that cannot be determined based on the set of business characteristics. The processor-readable instructions may be configured to cause the processor to cause the task list to be presented.

In some embodiments, a system for setting up enterprise software is presented. The system may include a processor. The system may also include a memory communicatively coupled with and readable by the processor and having stored therein a series of processor-readable instructions. The instructions, when executed by the processor, may cause the processor to receive a set of business characteristics in response to a questionnaire. The processor-readable instructions may be configured to cause the processor to analyze the set of business characteristics. The processor-readable instructions may be configured to cause the processor to determine, at least partially based on the set of business characteristics, a first subset of tasks of the task list not requiring user input, wherein each task of the set of tasks comprises one or more data gathering setup steps for enterprise software. The processor-readable instructions may be configured to cause the processor to determine, at least partially based on the set of business characteristics, a second subset of tasks of the task list requiring user input. The processor-readable instructions may be configured to cause the processor to generate the task list for display that indicates the second subset of the set of tasks needing to be completed. Each task of the second subset of tasks may require information that cannot be determined from the set of business characteristics. The processor-readable instructions may be configured to cause the processor to cause the task list to be presented.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 illustrates an embodiment of an interface of a task generator that presents questions to a user to customize a task list.

FIG. 5 illustrates an embodiment of a task list generated by a task generator.

FIG. 6 illustrates an embodiment of an interface detailing a modified task list generated by a task generator.

FIG. 7 illustrates an embodiment of an interface containing a task list.

FIG. 9 illustrates another embodiment of an interface containing a task list.

FIG. 10 illustrates an embodiment of an interface having a task list where tasks have designated owners.

FIG. 11 illustrates an embodiment of a task list that permits importing and exporting of task settings.

DETAILED DESCRIPTION

Figure 1:
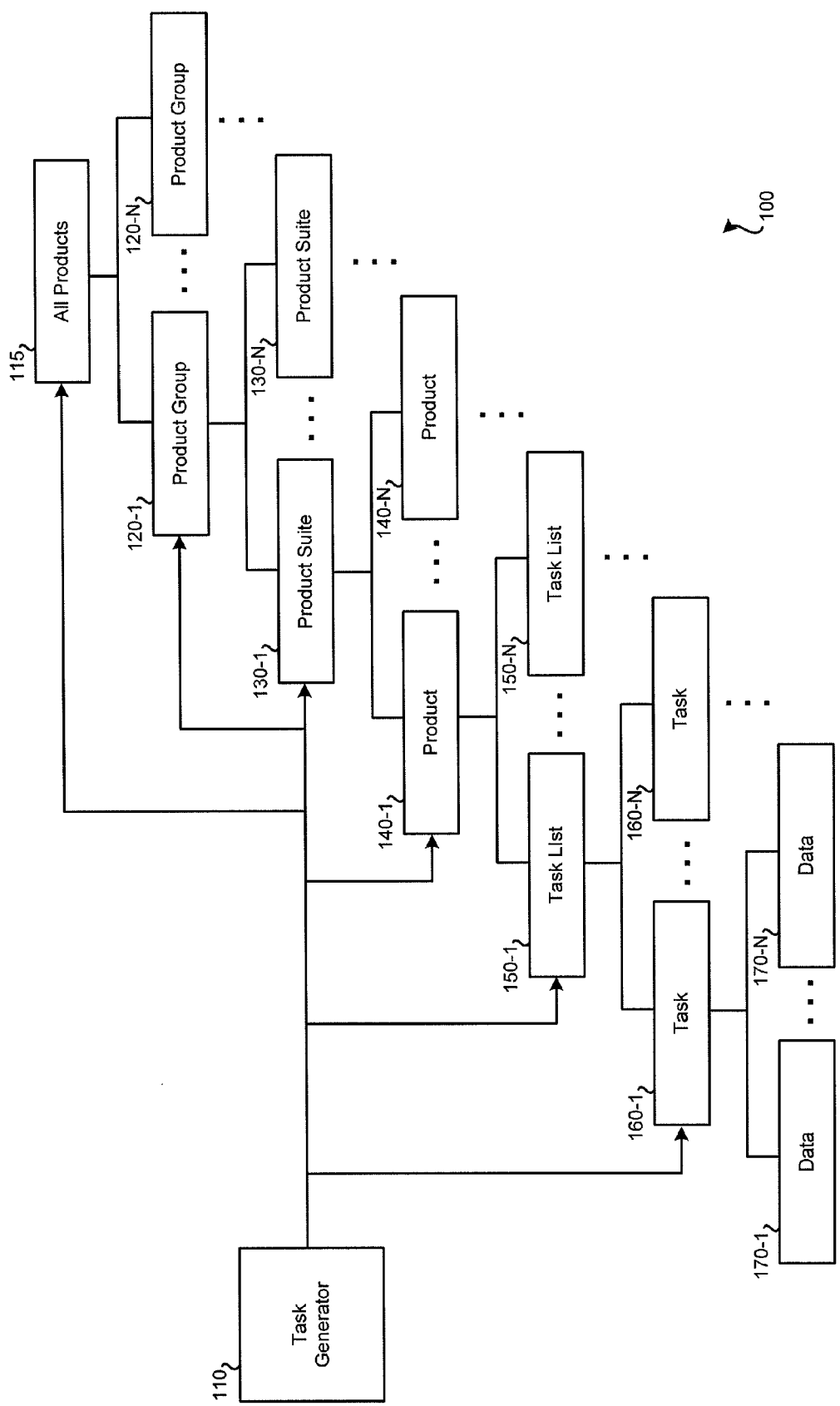
FIG. 1 illustrates an embodiment of a task generator functioning in various levels of an enterprise software hierarchy.

Using conventional arrangements, setup, installation or configuration of enterprise software, such as enterprise resource planning software, can be complicated and/or time-consuming. A task generator, as detailed herein, may be used to help ease such setup or configuration by customizing the process for a business or other entity (referred to as the "customer"), on whose behalf the enterprise software is being set up or configured.

A task generator may present a user, who is setting up, installing, or configuring (e.g., changing settings sometime after initial setup) enterprise software for a customer, with an initial set of questions, referred to as a questionnaire. Responses received to the questions of the questionnaire may be used to identify various tasks and task lists which may be: 1) completed without additional user input; 2) partially completed without additional user input; 3) require further user input; and 4) not necessary based on the user's responses to the questionnaire. Tasks and task lists may be presented to the user via a graphical interface that displays the tasks and task lists, possibly grouped according to category. The user may be permitted to complete some or all of the tasks in an order selected by the user or in a required, predetermined order. Each task may require the user to provide one or more pieces of data in response to data fields linked with each task. The user may be permitted to partially complete a task or task list and return to the task or task list at a later time, while, in the meantime, providing information to data fields of tasks present in the same or different task list.

Tasks and task lists, as completed, may be indicated as such. Further, indicators may be present that display various tasks as being dependent on information provided for other tasks. Tasks may be assigned to different owners, who may be other users responsible for completing those tasks. Individual tasks may also be locked, such that data associated with the task cannot be edited and/or viewed. Responses to the questionnaire may also be modified, thus resulting in one or more possible changes to the tasks, task lists, or task data to be completed by the user. The user may be provided with a listing of tasks that: 1) have remained unchanged; 2) have partially changed; 3) have been added; or 4) no longer require user input due to the responses to the questionnaire.

The task generator may be used for setup installation, and/or configuration of enterprise software at various levels of implementation. (Throughout this document, whether setup, installation, and/or configuration are referred to, it should be understood that the principles described herein may be applicable to all three scenarios. As an example, "setting up" enterprise software may also refer to "configuring" enterprise software and/or "installing" enterprise software.) For example, the task generator may be run for: 1) a task; 2) a task list (e.g., a feature of a product); 3) a product (e.g., a software application); 4) a product suite (e.g., a group of software applications); 4) a product grouping (e.g., a varied collection of software products and/or suites to fulfill a particular business function, such as manufacturing); or 5) all products offered by a software development firm. At each of these levels, a task generator can provide a user with a questionnaire to which the responses can be used to identify tasks and/or task lists to be included and task and/or task lists that are unnecessary to be included for a user during setup and/or configuration. For example, if a task generator provides a user with a questionnaire for setup and/or configuration on the product suite level, the responses from the user to the questionnaire may be used to structure tasks and task lists for multiple products within the product suite.

FIG. 1 illustrates a diagram 100 of an embodiment of a task generator executed in conjunction with various levels of an enterprise software hierarchy. The enterprise software hierarchy of diagram 100 contains: all products 115 level, product groups 120 level, product suites 130 level, products 140 level, task lists 150 level, tasks 160 level, and task data 170 level. Task generator 110 may provide a questionnaire and structure task lists and tasks for the all product 115 level, product grouping 120 level, product suites 130 level, products 140 level, task lists 150 level, and/or tasks 160 level. The software components of diagram 100 may be stored on one or more non-transitory computer-readable storage mediums and executed by one or more computer systems, such as the computer system of FIG. 16. Task generator 110 may be a separate piece of software from the software components being set up or configured.

Product grouping 120 may represent all enterprise software products produced by a software development firm that are used to fulfill a particular business function, such as manufacturing. As such, each product grouping 120 may contain one or more products and/or product suites 130. Product suites 130 level may contain one, two, or more product suites. Each product suite may contain one or more products. Some product suites may contain one or more of the same products as other product suites. Each product suite may be a group of enterprise applications that relates to a specific topic, such as financials. Products 140 level may contain one, two, or more products. Each product of products 140 may be an individual enterprise software application. Task list 150 level may represent task lists that may need to be completed for a particular product. Task list 150 level may contain one, two, or more task lists for a particular product. A particular task list can be associated with one or more products. A task list may contain one or more additional task lists. Tasks within a task list may be linked to a common topic. For example, a task list may contain tasks related to "cash and treasury management" or "accounts receivable." Within each task list, one, two, or more tasks 160 may be present. A task of tasks 160 may contain editable task data required to be completed by a user for setup or configuration to be completed. For example, a particular task may be related to one topic, such as "collections." As such, each piece of task data, which may be presented to the user as a setting, within this task may be in some way linked with how a software component will be set up or configured in relation to collections. Task data 170 may contain one, two, or more pieces of task data related to a task. Each piece of task data may be received from a user in response to an editable setting present in a task of tasks 160.

It should be understood that while each level of the software hierarchy is illustrated as only linked with the level directly subordinate and superior to it, other combinations may be possible. For example, products, rather than only having task lists, may have individual tasks directly linked with the product. Further, it should be understood that, for simplicity, only a portion of the software hierarchy has been illustrated. For example, product suite 130-N should be understood to be linked with various products at the products 140 level. Similarly, product 140-N should be understood to be linked with various task lists at the task lists 150 level, and so on. While product suite 130-1 is illustrated as linked with two products, 140-1 and 140-N, it should be understood that this is for example purposes only; fewer or greater numbers of products may be present in product suite 130-1. Similar variances in the numbers of subordinate components may be associated with product 140-1, task list 150-1, and task 160-1.

Task generator 110 may interact with the software hierarchy on all product 115 level, product group 120 level, product suites 130 level, products 140 level, task lists 150 level, and/or tasks 160 level. A questionnaire for software components at each level may be implemented via task generator 110. The responses received from a user to the questions presented in the questionnaire via task generator 110 may be used by task generator 110 to structure task lists and tasks of subordinate (or superior) components. Using the responses to the questionnaire, task generator 110 may be able to 1) complete tasks and/or task lists without additional user input; 2) identify and remove unnecessary tasks and/or task lists; 3) identify tasks and/or task lists that need to be addressed by the user; and 4) partially complete tasks and/or task lists.

As an example, task generator 110 may be used to initially configure product suite 130-1 of enterprise software, such as enterprise resource planning software, for a customer. As such, in this instance, task generator 110 may be implemented on the product suites 130 level. Task generator 110 may present a user (such as an employee who is interacting with task generator 110 on behalf of the customer) with a questionnaire structured for product suite 130-1. This questionnaire may present the user with questions that pertain to the setup and/or configuration of one or more products within the product suite. The user's responses to the questionnaire may be used to structure task lists and/or tasks for multiple products within product suite 130-1. As such, rather than having to provide duplicative information for each product of product suite 130-1, a user may only need to provide such information once at the product suite level. Based on the user's responses to the questionnaire, task lists and/or tasks of product suite 130-1 and subordinate components, such as product 140-1, may be completed, partially completed, identified as requiring input from the user, or removed from being presented to the user as unnecessary.

Following the user completing the questionnaire, the user may provide task data for various tasks within task lists. These task lists and/or tasks may be linked with multiple products of product suite 130-1 or individual products. The user may subsequently execute task generator 110 for a subordinate component of product suite 130-1, such as product 140-1. When task generator 110 is executed specifically for product 140-1, a different questionnaire may be presented to the user containing questions specific to product 140-1. Again here, the user's responses may be used to determine which task lists and/or tasks: 1) are completed without additional user input; 2) are unnecessary; 3) require user input; and 4) are partially completed.

Figure 2:
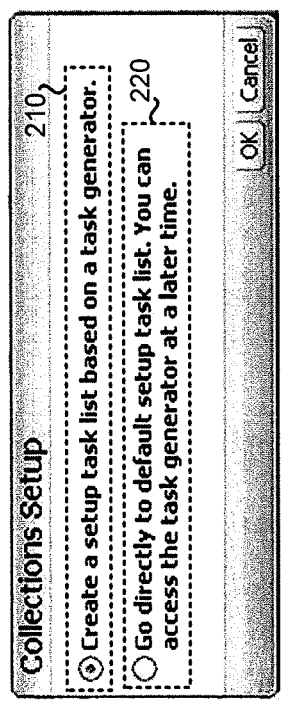
FIG. 2 illustrates an embodiment of an interface of a task generator.

When a user desires to set up or configure enterprise software, a task generator may be executed. The user may specify which component of the software hierarchy the task generator is being executed in conjunction with. FIG. 2 illustrates an embodiment of an interface 200 of a task generator, such as task generator 110 of FIG. 1. This interface (which may be one of many) may be presented to the user prior to the user being presented with a questionnaire, task lists, and/or tasks. The user may be permitted to select option 210 which triggers the task generator to generate a task list, containing tasks based on responses supplied by the user to a questionnaire. In some embodiments, the user may be permitted to skip the questionnaire and proceed to a default task list. In some embodiments, the user may be taken directly to the questionnaire. The default task list may contain tasks and/or task lists that normally need to be addressed during a typical setup and/or configuration of the enterprise software. In some embodiments, use of the task generator may be set as mandatory, thus requiring a user to use the task generator.

If the user indicates option 210, the user may be provided with a questionnaire. The responses to the questionnaire may be used to customize the tasks and/or task lists presented by the task generator to the user. Task data may be prefilled in for various tasks in a partial or full manner. Such data that has been prefilled, may be shown or hidden when the associated task is accessed. FIG. 3 illustrates an embodiment of an interface 300 of a task generator that presents questions to a user to customize a task list and tasks. While interface 300 is used to customize a task list and tasks, other questionnaires may be used to customized setup and/or configuration at the all product, product group, product suite, or product level. Interface 300 may represent all or a portion of a questionnaire presented to a user, other interfaces may present other portions of the questionnaire. The responses provided by the user to the questionnaire may be used by the task generator to customize a task list and tasks. The responses provided by the user to the questionnaire may be referred to as business characteristics, and may relate to the business needs of the customer. For instance, referring to interface 300, question 310 posed to the user asks: "Which of the following does your organization collect?" The user has the option of selecting loans or lease contracts for response 320. Based on the user's selection, tasks presented in the task list may be customized accordingly. For example, if "loans" is selected, the tasks and/or task lists pertaining to the other option, "lease contracts," may be eliminated. While interface 300 contains only four questions, it should be understood that a greater or fewer number of questions of a questionnaire may be posed to the user via one or more interfaces. For example, a questionnaire may span several pages that are presented to the user. In some embodiments, the questions are presented via a wizard-style interface. Other presentations of questions in a questionnaire are also possible.

Figure 4:
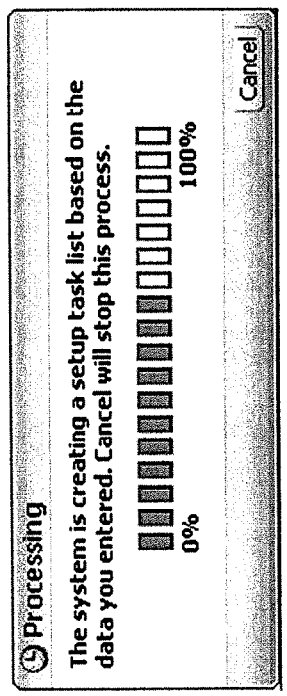
FIG. 4 illustrates an embodiment of another interface of a task generator.

Following the questionnaire being completed by the user, the user's responses may be used to generate task lists and tasks. FIG. 4 illustrates an embodiment of an interface 400 displayed while a task generator is generating a task list. At this point, the task generator, at least partially based on the user's responses to questions of the questionnaire, determine which tasks: 1) do not require additional information from the user (e.g., are already completed) based on the responses to the questionnaire; 2) are not necessary (e.g., based on the user's responses, are irrelevant to the setup or configuration of the enterprise software for the customer); 3) require user input; or 4) are partially completed (e.g., at least some task data required can be prefilled based on the user's responses to the questionnaire). While the illustrated embodiment of interface 400 is directed to tasks, a similar determination can be made at other levels, such as the all product level, the product group level, product suite level, product level, and task data level.

Following the task list being generated, the task list may be presented to the user. FIG. 5 illustrates an embodiment of an interface 500 containing a task list 510. Task list 510 contains task lists 520. As such, task lists 520 are part of task list 510. Each task list contains one or more related tasks. Each task may be associated with one or more editable settings (task data) associated with a particular topic. For simplicity, only one task, task 530, of the ten illustrated tasks, is denoted. Task 530 is a member of task list 520-1. For each task, a corresponding status is displayed in status column 540. The status may indicate whether the task is: completed (e.g., no additional user input necessary); partially completed (e.g., some of the necessary data for the task has been provided based on the user's responses to the questionnaire, a user has input some of the necessary task data); or yet to be completed. For each task, a selection may be made to "go to" the task. Going to the task may allow the user to edit the task data of that particular task. In some embodiments, a status for each task may be set manually by a user.

The user may be permitted to select tasks for completion or modification in an order of the user's choosing. For example, the user may be permitted to address task 530 prior to the preceding task or any of the following tasks. Following completion of a task, the user may return to task list 510 to complete or modify other tasks. In some embodiments, an order of completion may be required. Column 550 may list dependencies of tasks. A task having a dependency may indicate that one or more pieces of task data within the task are dependent on, or affect task data, associated with another task. As such, setting or modifying the dependent task data associated with the task may affect another task and/or cause a conflict with another task. Column 560 may indicate when a task was last updated (e.g., edited by a user).

Within each task list, various tasks may be listed. For example, task list 520-1 contains task 530 and two additional tasks. Task list 520-1 may be collapsed such that only the title of the task list, and not the tasks themselves, are visible. This may be useful if the user does not intend on addressing task list 520-1 until other tasks have been addressed. When viewing task list 510, the user may be able to view multiple tasks, task lists, statuses, dependencies, and/or update times at the same time, as illustrated in FIG. 5.

While interface 500 illustrates tasks and task lists in the form of a hierarchal list, it should be understood that other arrangements may be used. For example, tasks and/or task lists may be represented graphically, such as by icons, rather than by presenting task lists and their contents in the form of a hierarchal list. In some embodiments, each task list could appear in a dialog window, with tasks filling the window. It should be understood that other arrangements for presenting tasks and task lists to users are possible.

Additionally, option 570 is an "edit task generator" selection. Option 570 may permit a user to return to the questionnaire and modify the user's responses to the questionnaire. Modifications to the user's responses may result in changes to task list 510. Following modification of the responses to the questionnaire, the tasks and task data present in the tasks list may change. For example, additional tasks or fewer tasks may be present. Dependencies may also change. As an example, if the user wishes to edit the task generator for a specific task list, such as "collections setup," the user may first selects the table row of the task lists or task they want to edit the questionnaire for. The user may then click option 570. The user will be brought to the questionnaire for the selected task lists and tasks. Similar techniques may be applied to the all product, product group, product suite, and product levels.

If a user has modified responses to the questionnaire, an interface detailing the changes to the task and/or task list may be presented. FIG. 6 illustrates an embodiment of an interface 600 detailing a modified task list. In response to modifications, changes have been made to tasks and task data in the task list by the task generator. Information 610 identifies the number of tasks that have been added (e.g., new tasks), the number of tasks that have not changed, the number of tasks that have changed as a result of the modification to the user's responses, and/or the number of tasks removed. Other such information may also be presented to the user. Task list summary 620 may detail which tasks have been added, changed, or remain unchanged. Change detail list 630 may identify the changes of task data for one or more tasks and/or task lists that are selected.

Figure 7:
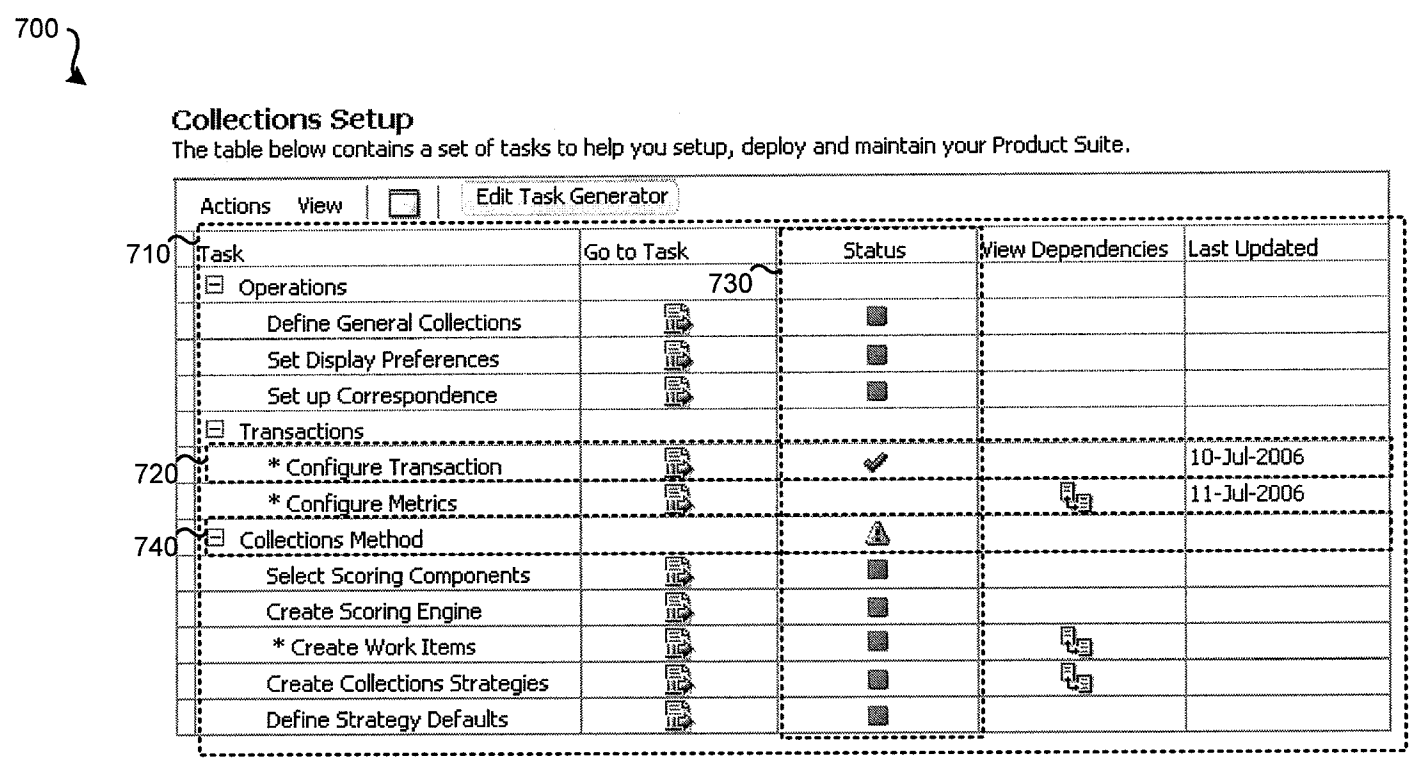

FIG. 7 illustrates an embodiment of an interface 700 containing a task list 710. In task list 710, tasks with various statuses are illustrated. Task 720 is complete. The indicator in status column 730 for task 720 indicates that task 720 is complete (e.g., all of the necessary information for that particular task has been obtained). The status of some other tasks, indicated by a box in status column 730, indicates tasks yet to be completed by the user. Task list 740 has a status that indicates a warning. The warning may indicate that task data provided for one or more tasks has resulted in one or more errors, conflicts, and/or problems.

Figure 8:
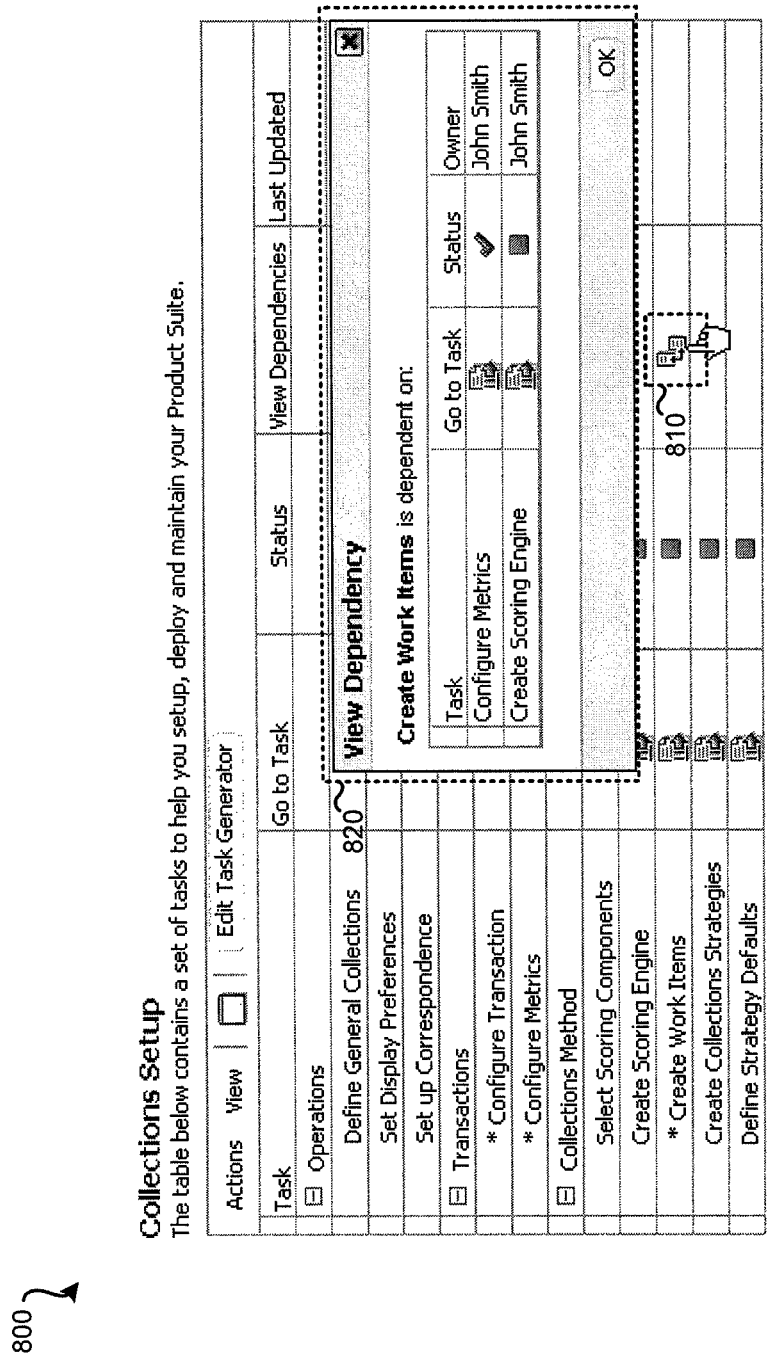
FIG. 8 illustrates an embodiment of an interface displaying dependencies of a task present on a task list.

A task may be dependent on one or more other tasks and/or other tasks may be dependent on the task. As such, an indicator that indicates dependency between data within tasks may be displayed for a task. By selecting the dependency indicator, the dependencies may be reviewed by the user. FIG. 8 illustrates an embodiment of an interface 800 displaying dependencies of a task. If a user selects dependency indicator 810, dependency interface 820 may be displayed. Dependency interface 820 may display various tasks that are dependent on the task linked with dependency indicator 810. In some embodiments, dependency interface 820 may, alternatively or additionally, indicate tasks that depend from the task linked with dependency indicator 810. Dependency interface 820 may indicate the name of the dependency-related tasks, the status of such tasks, and/or the owner of such tasks. Other information about the dependency-related tasks may also be presented.

FIG. 9 illustrates another embodiment of an interface 900 containing a task list 910. Task lists may contain various fields of information in addition to task statuses, names of tasks, and when tasks were last updated. For example, task list 910 contains approval status fields. Approval status fields indicate whether a user is required to receive approval, such as from another user (e.g., a supervisor), before viewing and/or modifying data associated with a task. As illustrated, task 920 requires approval by a person other than the user.

FIG. 10 illustrates an embodiment of an interface 1000 having a task list 1010 in which tasks have designated owners. Designated owners, as noted in column 1020, denotes particular tasks assigned to particular persons. The designated person may be responsible for completion of the corresponding task. A user may be prevented from accessing another user's task. If a task is locked, as indicated by lock indicators 1030, users (such as users who are not the owners, do not have the proper security permissions, have not been assigned to a task, etc.) may be prevented from modifying and/or viewing data associated with the task.

As previously detailed, in relation to FIG. 1, a task generator may be run for various levels of a software hierarchy. For example, a task generator may be run for all products, a product group, product suite, an individual product, a task list, or a specific task. As such, when running a task generator, various responses and/or settings provided for a software component (possibly on another computer system) may be applicable to some other software component (on a second computer system). As such, task data may be imported and exported. FIG. 11 illustrates an embodiment of an interface 1100 having a task list that permits importing and exporting of task settings. Interface 1100 contains menus 1130 that permit a user to either import task settings (e.g., data associated with tasks, including questionnaire data for that task, if applicable) or export task settings. Importing task data may result in all tasks that are common to the task data being imported and the current tasks being set to the values of the imported task data. Exporting task data may result in task settings being saved to a file which may be imported by the same or different task generator on the same or a different computer system at some other time.

Figure 12:
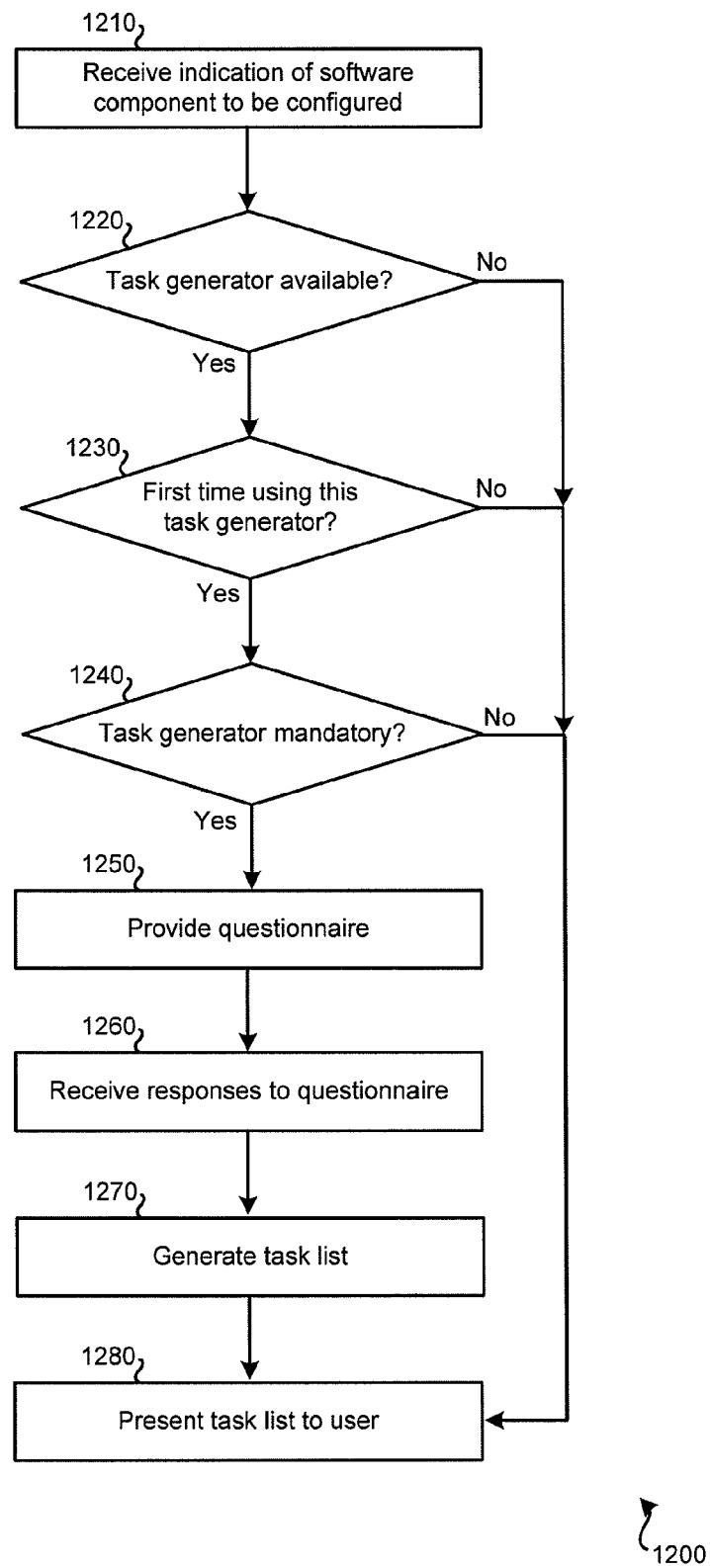
FIG. 12 illustrates an embodiment of a method for generating a task list.

Embodiments of the task generator detailed in relation to FIGS. 1-11 may be used to perform various methods. FIG. 12 illustrates an embodiment of a method 1200 for generating a task list using the task generator. Method 1200 may be performed by a task generator, such as the embodiments of task generators previously described. Method 1200 may also be performed by some other arrangement. Each step of method 1200 may be performed by one or more computer systems which may be executing the task generator. Method 1200 may be performed at various levels within a software hierarchy, such as of FIG. 1.

At step 1210, an indication of a software component to be configured, or reconfigured, may be received by a task generator. Referring to FIG. 1, a task generator may be used to set up or configure software components on an all products level, a product group level, a product suite level, a product level, a task list level, or a task level. A user may provide an indication of what software component (such as an indication specifying a particular product) is to be configured or set up. As an example, a user may try to access a software component for setup or configuration. If a task generator is associated with the component being accessed, the user will be prompted to see if the user desires to use it. In some embodiments, the user may be required to use the task generator. As another example, the user may initiate execution of the task generator and then select a software component for setup or configuration from a menu.

At step 1220, it may be determined whether the task generator is available for the selected software component. For the task generator to be available for use in configuring or setting up a software component, a questionnaire may need to be created by the developer of the selected software component or some third-party (which may be a customer) to gather business characteristics about the customer on whose behalf the enterprise software component is being configured or set up. If the task generator is not available, such as if a questionnaire has not been created for the selected software component, method 1200 may proceed to step 1280. At step 1280, since the task generator is not available, a default task list and tasks may be presented to the user. These tasks and task lists may include tasks identified to be the typical tasks needed to be configured or set up for a customer by a user. If the task generator is determined to be available at step 1220, method 1200 may proceed to step 1230.

At step 1230, the task generator may determine whether or not this is the first time the task generator has been executed for the indicated software component (in other words, whether the task generator is being used for setup or configuration). If yes, set up of the indicated software component is being performed (e.g., the software component is being set up), method 1200 may proceed to step 1240. In some embodiments, if configuration is being performed (e.g., the software has previously being installed and set up), method 1200 proceeds to step 1280. At step 1280 a task list containing the already generated task lists may be presented to the user. The user has the ability to navigate and access specific task lists and task for which the user has proper security permissions.

At step 1240, the creator (which may be a software developer, a third party, or some other user of the customer) of the task generator has the option of making use of the task generator mandatory or optional for the user. If optional, the user may select to either use the task generator and proceed to step 1250 or proceed directly to step 1280. If the task generator is mandatory, method 1200 may proceed to step 1250.

At step 1250, the user may be provided with a questionnaire. The questionnaire may be similar to interface 300 of FIG. 3. The questions presented via the questionnaire provided may be specific to the software component being configured. The contents of the questionnaire may be determined by a developer, customer, and/or a third-party. Questions presented in the questionnaire may be pertinent to one or more pieces of task data, task lists, products, product suites, or product groupings. For example, if the software component indicated at step 1210 is a product suite, the questions of step 1250 may relate to multiple products within the product suite. At step 1260, responses to some or all of the questions may be received from the user.

At step 1270, a task list and tasks may be generated. The task lists and tasks may be based, at least partially, on the responses received from the user to the questionnaire of step 1250. Generation of task lists may involve identifying tasks and other task lists that: 1) are not necessary for a customer and/or do not need any further input to be completed by the user; 2) are applicable to the customer and need to be completed by the user; 3) have been be partially completed (e.g., portions of the task's data fields can be completed based on the user's responses to the questionnaire; and 4) are tasks and their respective data fields that would not be present on the default list of tasks but are added to the task list in response to the responses to the user's questionnaire. Specific task data fields for specific tasks may or may not be included based on the answers provided by the user in the questionnaire. This may reduce information clutter and eliminate showing unnecessary fields to a customer's users when the specific task data fields are not applicable for that customer.

A task list, such as the task list presented in interface 500 of FIG. 5, may be generated at step 1270. The task list may contain various tasks and/or additional task lists. Associated with each task and/or task list may be an indication of whether a task is complete, partially complete, requiring input, or dependent on one or more other tasks; whether one or more other tasks depend on the task; when the task was last updated; whether the data fields associated with the task is available to be edited or viewed; and/or the owner of the task (e.g., an indication of a user responsible for completing the task). At step 1280, the task list may be presented to the user. Once presented to the user, the user may have the ability to view tasks and provide task data for each task.

Figure 13:
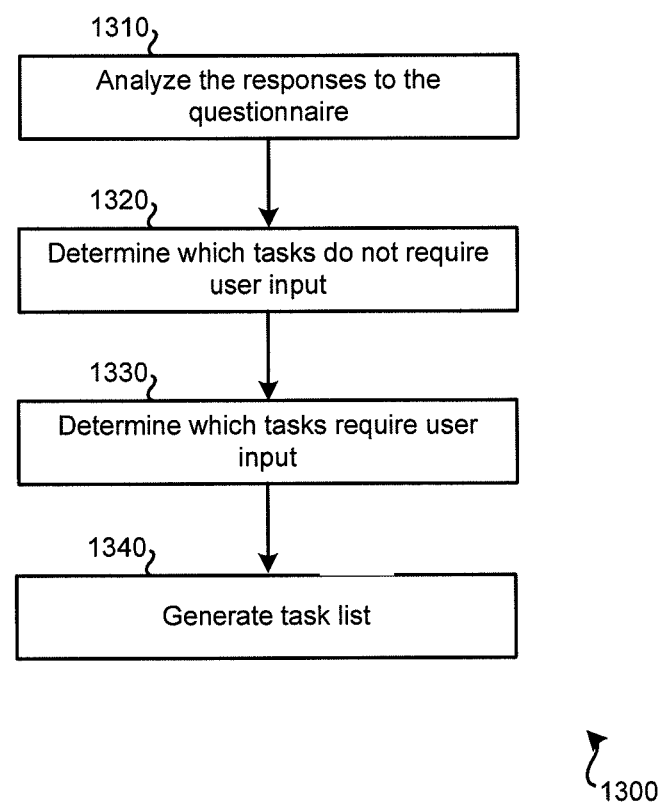
FIG. 13 illustrates an embodiment of a method for generating a task list.

FIG. 13 illustrates an embodiment of a method 1300 for generating a task list. Method 1300 may be performed in place of method 1200 of FIG. 12. As such, method 1300 may be performed by a task generator, such as embodiments of task generators previously described. Method 1300 may also be performed by some other arrangement. Each step of method 1300 may be performed by one or more computer systems (which may be executing the task generator).

At step 1310, the user's responses to a questionnaire of a task generator may be analyzed. This may involve determining whether the submitted responses are valid (e.g., the values and/or selections are permitted by the task generator and/or the values/selections do not conflict with other responses provided by the user). If invalid responses are received, the user may be informed as such and prompted to provide corrected responses.

At step 1320, it may be determined which tasks do not require user input. Tasks may not require user input for multiple reasons. Information received as responses from the user to the questionnaire may contain sufficient information for a task to be completed without further user input. Information received as responses to the questionnaire may also be used to determine tasks that are unnecessary. When the task list is generated, tasks that have been completed based on the user's responses to the questionnaire may be indicated as such. In some embodiments, such tasks may not be presented to the user. Similarly, tasks that do not require user input may not be displayed or may be denoted as unnecessary.

At step 1330, tasks that require additional user input may be identified. These may be tasks that require a user to respond to additional questions. These tasks may also include tasks that were partially completed based on information provided in response to the questionnaire. Partially completed tasks may be denoted as such.

At step 1340, the task list may be generated. Which tasks are completed, partially completed, presented to the user, and/or not presented to the user may be dependent on steps 1310 through 1330 of method 1300.

Figure 14:
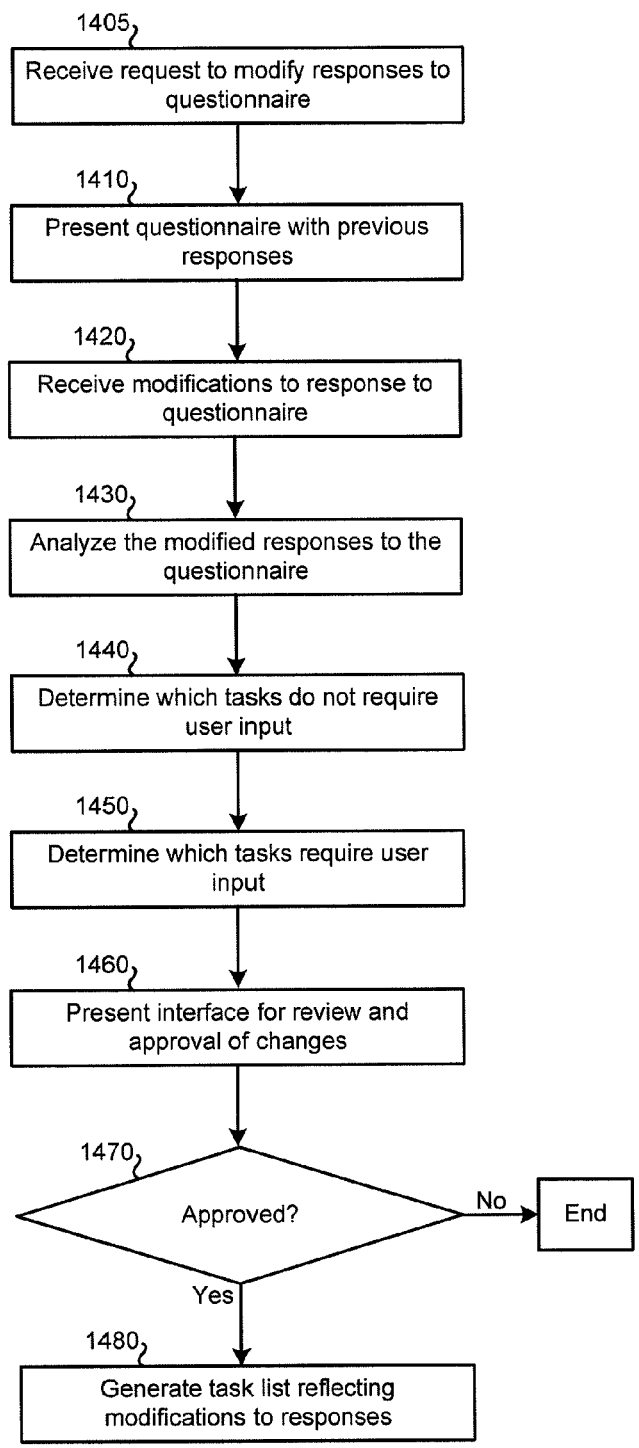
FIG. 14 illustrates an embodiment of a method for generating a modified task list.

FIG. 14 illustrates an embodiment of a method 1400 for generating a modified task list during reconfiguration. Method 1400 may be performed by a task generator, such as embodiments of task generators previously described. Method 1400 may also be performed by some other arrangement. Each step of method 1400 may be performed by one or more computer systems (which may be executing the task generator).

At step 1405, a request to modify responses to the questionnaire may be received. As an example, referring to FIG. 5, option 570 may be used as the request to edit the task generator and thus modify responses to the questionnaire. At step 1410, the user may be presented with the questionnaire. The previous responses provided by the user (or by some other user) may be prefilled into fields linked with the questions of the questionnaire. At step 1420, one or more modifications to the responses from the user may be received.

The modified responses may be analyzed at step 1430. This may involve determining whether the submitted responses are valid (e.g., the values are permitted by the task generator and/or the values do not conflict with other responses provided by the user). If invalid responses are received, the user may be informed as such and prompted to provide corrected responses.

At step 1440 it may be determined which tasks do not require user input based on the modified responses. As previously detailed, tasks may not require user input for multiple reasons. Information received as modified responses from the user to the questionnaire may contain sufficient information for a task to be completed. Information received as modified responses to the questionnaire may also be used to determine tasks that are unnecessary. When the task list is generated, tasks that have been completed based on the user's responses to the questionnaire may be indicated as such. In some embodiments, such tasks may not be presented to the user. Similarly, tasks that do not require user input may not be displayed or may be displayed and denoted as completed (such that, if warranted, a user can manually edit).

At step 1450, following the one or more modified responses, tasks that require additional user input may be identified. These may be tasks that require a user to respond to additional questions. These tasks may also include tasks that were partially completed based on information provided in response to the questionnaire.

At step 1460, an interface may be presented to the user that identifies potential changes to tasks, task lists, and task data associated with tasks. At step 1460, only the tasks, task lists, and/or task data that changed may be displayed. A comparison between the previous state and the modified state may be presented. At step 1470, the user may approve or reject the changes. If the user approves the changes, the method may proceed to step 1480. If the user rejects the changes, the changes may be canceled. Method 1400 may end or return to step 1410.

At step 1480, a task list reflecting the modified responses to the questionnaire may be generated. The task list may be accompanied by an indication of the number of tasks that have been generated as a result of the modifications, the number of tasks that have been changed as a result of the modifications, and/or the number of tasks that have not changed as a result of the modifications. Further, a breakdown of which individual tasks have changed, have been generated, or not changed may be presented. For example, interface 600 of FIG. 6 shows an exemplary listing of changes to a task list following a user providing modified responses to a questionnaire.

Figure 15:
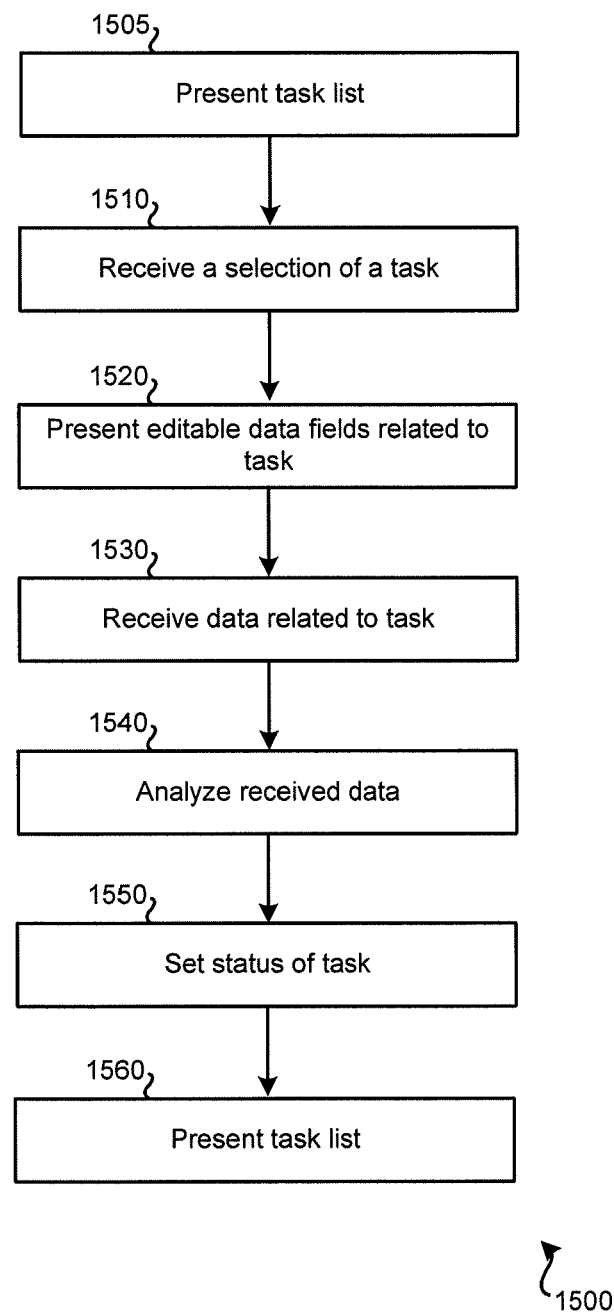
FIG. 15 illustrates an embodiment of a method for completing tasks.

FIG. 15 illustrates an embodiment of a method 1500 for completing tasks. Prior to performing method 1500, one or more methods such as method 1200, method 1300 and/or method 1400 may have been performed. Method 1500 may be performed by a task generator, such as embodiments of task generators previously described. Method 1500 may also be performed by some other arrangement. Each step of method 1500 may be performed by one or more computer systems (which may be executing the task generator).

At step 1505, a task list may be presented to a user. The task list may be similar to task list 510 of FIG. 5. Other embodiments of task lists, such as a task list having tasks represented by graphics (e.g., icons), may also be possible. Some or all of the tasks the user has the opportunity to select from may be presented to the user via a single graphical user interface at the same time. At step 1510, the user may select a task. The user may be permitted to select from various different tasks from different task lists on the task list at the same time. As such, the order in which at least some tasks are completed may be decided by the user. The user may also select to expand or collapse task lists as desired by the user.

At step 1520, after the user has selected a specific task, editable task data fields specific to the selected task may be presented to the user. Some or all of these task data fields may be prefilled with task data. For example, if a task is entitled "Create Scoring Engine," each editable task data field presented in response to selection of that task may be related to creating a scoring engine. At step 1530, the user may provide data for some or all of the task data fields linked to the task.

At step 1540, once the user has completed providing task data for the task data fields, the task data may be analyzed. The analysis may determine whether any of the user's input data is invalid, conflicts with other task data, or is incomplete. At step 1550, the status of the task may be set. If all necessary task data has not been provided by the user, the status of the task may be set as incomplete. If analysis revealed a problem with one or more of the user's input pieces of task data, the status may be set to a warning/error. If the task is complete, the status may be set to complete. Statuses may be set manually or automatically. Other possible settings for a task may also be possible, such as: in progress, warning, on hold.

At step 1560, the task list may again be presented to the user. The status of the task selected at step 1510 may be updated in accordance with step 1550, and the status of the task selected at step 1510 may be displayed as such. The user may now select another task to complete (or could re-enter the same task for modification).

Figure 16:
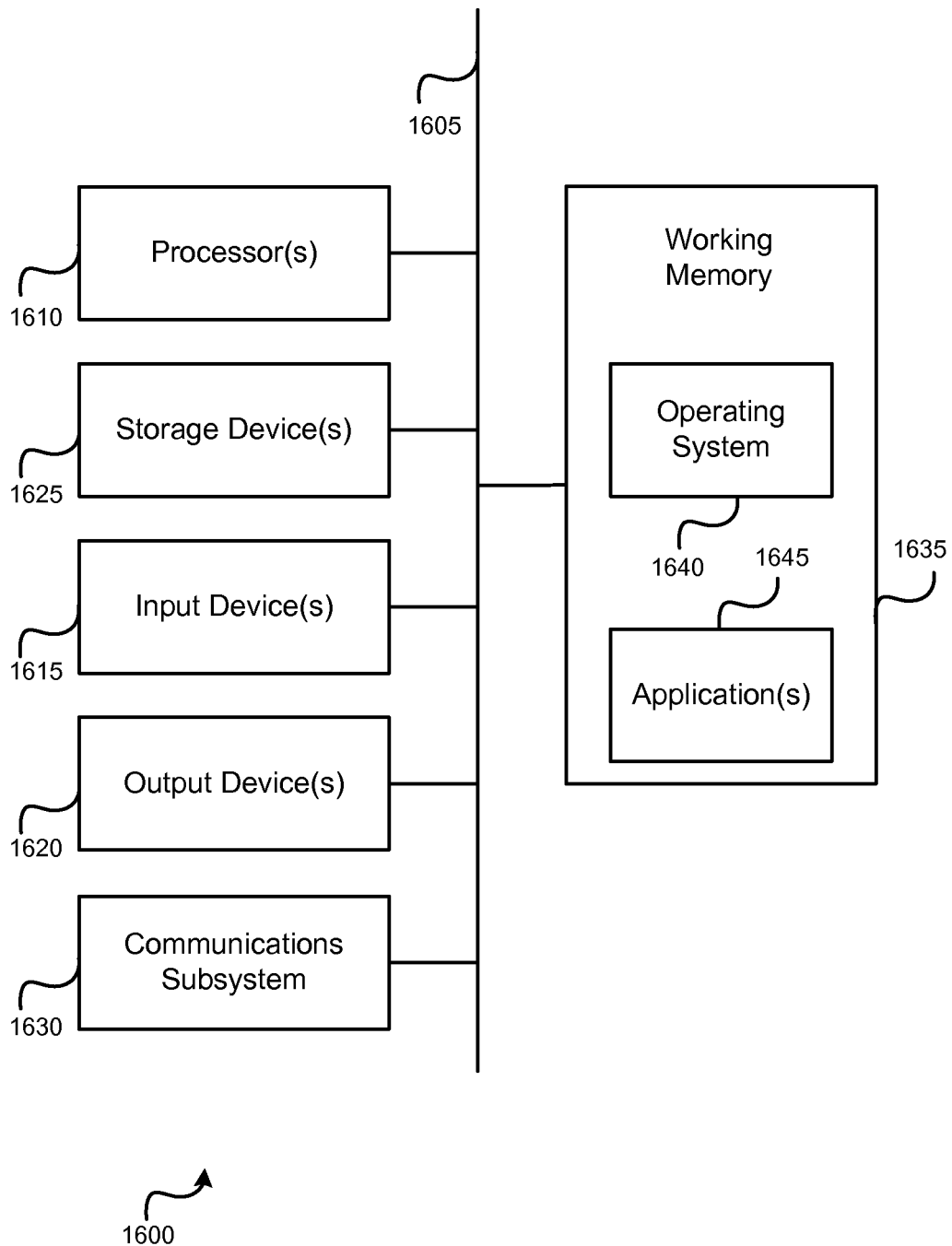
FIG. 16 illustrates an embodiment of a computer system.

FIG. 16 illustrates an embodiment of a computer system. A computer system as illustrated in FIG. 16 may function as the previously mentioned computer system. For example, computer system 1600 can execute the software components and/or the task generator. FIG. 16 provides a schematic illustration of one embodiment of a computer system 1600 that can perform the methods provided by various other embodiments, as described herein. It should be noted that FIG. 16 is meant only to provide a generalized illustration of various components, any or all of which may be utilized as appropriate. FIG. 16, therefore, broadly illustrates how individual system elements may be implemented in a relatively separated or relatively more integrated manner.

The computer system 1600 is shown comprising hardware elements that can be electrically coupled via a bus 1605 (or may otherwise be in communication, as appropriate). The hardware elements may include one or more processors 1610, including without limitation one or more general-purpose processors and/or one or more special-purpose processors (such as digital signal processing chips, graphics acceleration processors, and/or the like); one or more input devices 1615, which can include without limitation a mouse, a keyboard and/or the like; and one or more output devices 1620, which can include without limitation a display device, a printer and/or the like.

The computer system 1600 may further include (and/or be in communication with) one or more non-transitory storage devices 1625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1600 might also include a communications subsystem 1630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1630 may permit data to be exchanged with a network (such as the network described below, to name one example), other computer systems, and/or any other devices described herein. In many embodiments, the computer system 1600 will further comprise a working memory 1635, which can include a RAM or ROM device, as described above.

The computer system 1600 also can comprise software elements, shown as being currently located within the working memory 1635, including an operating system 1640, device drivers, executable libraries, and/or other code, such as one or more application programs 1645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1625 described above. In some cases, the storage medium might be incorporated within a computer system, such as the computer system 1600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1600 and/or might take the form of source and/or installable code, which, upon compilation and/or installation on the computer system 1600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1600) to perform methods in accordance with various embodiments of the invention. According to a set of embodiments, some or all of the procedures of such methods are performed by the computer system 1600 in response to processor 1610 executing one or more sequences of one or more instructions (which might be incorporated into the operating system 1640 and/or other code, such as an application program 1645) contained in the working memory 1635. Such instructions may be read into the working memory 1635 from another computer-readable medium, such as one or more of the storage device(s) 1625. Merely by way of example, execution of the sequences of instructions contained in the working memory 1635 might cause the processor(s) 1610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1600, various computer-readable media might be involved in providing instructions/code to processor(s) 1610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1625. Volatile media include, without limitation, dynamic memory, such as the working memory 1635.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1600.

The communications subsystem 1630 (and/or components thereof) generally will receive signals, and the bus 1605 then might carry the signals (and/or the data, instructions, etc. carried by the signals) to the working memory 1635, from which the processor(s) 1610 retrieves and executes the instructions. The instructions received by the working memory 1635 may optionally be stored on a storage device 1625 either before or after execution by the processor(s) 1610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for setting up software products, the method comprising:
   receiving, by a first computer system, a set of characteristics in response to a questionnaire, wherein the set of characteristics indicates needs of an organization;
   analyzing, by the first computer system, the set of characteristics;
   determining, by the first computer system, a task list comprising a set of tasks associated with at least one of setting up, installing, or configuring a set of one or more software products, wherein each task of the task list comprises one or more data gathering steps;

determining, by the first computer system, based on the received set of characteristics, a first subset of tasks of the task list not requiring user input;

determining, by the first computer system, based on the received set of characteristics, a second subset of tasks of the task list requiring user input;

generating, by the first computer system, the task list for display as part of a single interface that indicates the first subset of tasks, and the second subset of tasks of the task list;

determining, for each task of the first subset of tasks and the second subset of tasks, an associated task owner;

presenting, by the first computer system, the task list such that the task list is subdivided into a plurality of sub-task lists, wherein each task in the plurality of sub-task lists is presented with an associated graphical indication of status;

displaying the associated task owner within the presentation of the task list, for each task of the first subset of tasks and the second subset of tasks;

in response to receiving a selection of a selectable dependency indication associated with a first task, displaying task dependency data associated with the first task, the task dependency data comprising:
 a third set of tasks on which the first task depends for completion; and
 a fourth set of tasks that depend on the first task for completion, wherein task dependency data includes, for each of the third set of tasks and the fourth set of tasks, an associated task owner and a task status; and installing the set of software products on one or more additional computer systems, wherein:
 during the installation, each task of the first subset of tasks of the task list is completed without further input, based on the received set of characteristics from the questionnaire; and
 during the installation, each task of the second subset of tasks of the task list requires information that cannot be determined based on the set of characteristics.

2. The method for setting up software products of claim 1, wherein
tasks of the second subset of tasks are configured to be completed in varying orders.

3. The method for setting up software products of claim 1, wherein
the task list is linked with a product suite,
a particular task of the second subset of tasks is linked with setup for a first product of the product suite, and
a second particular task of the second subset of tasks is linked with setup for a second product of the product suite.

4. The method for setting up software products of claim 1, wherein
the task list is linked with a product group,
a particular task of the second subset of tasks is linked with setup for a first product suite of the product group, and
a second particular task of the second subset of tasks is linked with setup for a second product suite of the product group.

5. The method for setting up software products of claim 1, wherein displaying the task list comprises graphically indicating at least one task of the second subset of tasks as completed.

6. The method for setting up software products of claim 1, further comprising:
following generating the task list that indicates the second subset of tasks to be completed, receiving, by the first computer system, modifications to the set of characteristics, thereby generating a modified set of characteristics;
analyzing, by the first computer system, the modified set of characteristics;
determining, by the first computer system, at least partially based on the modified set of characteristics, a modified first subset of tasks of the task list not requiring user input;
determining, by the first computer system, at least partially based on the modified set of characteristics, a modified second subset of tasks of the task list requiring user input; and
displaying, by the first computer system, indications of changed, unchanged, added and deleted tasks from the second subset of tasks to the modified second subset of tasks.

7. The method for setting up software products of claim 1, further comprising:
determining a required order for completing at least two tasks in the task list; and
displaying, within the presentation of the task list, data identifying the required order for completing at least two tasks.

8. The method for setting up software products of claim 7, further comprising:
receiving a selection of a particular task via the display presentation of the task list;
determining, based on the required order for completing at least two tasks, that the particular task cannot be completed until a second particular task is completed; and
prohibiting completion of the particular task via the display presentation of the task list, based on the determination that particular task cannot be completed until the second particular task is completed.

9. The method for setting up software products of claim 1, further comprising:
determining that completion of a particular task in the task list depends on information provided for a second particular task in the task list, wherein the particular task is within a first sub-task list and the second task is within a second sub-task list in the display presentation of the task list; and
providing a selectable dependency indication in a portion of the display presentation of the task list associated with the particular task.

10. The method for setting up software products of claim 1, further comprising:
determining, for each task of the first subset of tasks and the second subset of tasks, whether the task is in a locked state; and
displaying a lock indicator within the presentation of the task list, for each task in a locked state among the first subset of tasks and the second subset of tasks.

11. A computer program product residing on a non-transitory processor-readable medium and comprising processor-readable instructions configured to cause a processor to:
receive a set of characteristics in response to a questionnaire, wherein the set of characteristics indicates needs of an organization;
analyze the set of characteristics;

determine a task list comprising a set of tasks associated with at least one of setting up, installing, or configuring a set of one or more software products, wherein each task of the task list comprises one or more data gathering steps;

determine, based on the received set of characteristics, a first subset of tasks of the task list not requiring user input;

determine, based on the received set of characteristics, a second subset of tasks of the task list requiring user input;

generate a task list for display as part of a single interface that indicates the first subset of tasks, and the second subset of tasks;

determine, for each task of the first subset of tasks and the second subset of tasks, an associated task owner;

cause the task list to be presented such that the task list is subdivided into a plurality of sub-task lists, wherein each task in the plurality of sub-task lists is presented with an associated graphical indication of status;

display the associated task owner within the presentation of the task list, for each task of the first subset of tasks and the second subset of tasks;

in response to receiving a selection of a selectable dependency indication associated with a first task, display task dependency data associated with the first task, the task dependency data comprising:

a third set of tasks on which the first task depends for completion; and a fourth set of tasks that depend on the first task for completion, wherein task dependency data includes, for each of the third set of tasks and the fourth set of tasks, an associated task owner and a task status; and install the set of software products on one or more computer systems, wherein:

during the installation, each task of the first subset of tasks of the task list is completed without further input, based on the received set of characteristics from the questionnaire; and during the installation, each task of the second subset of tasks of the task list requires information that cannot be determined based on the set of characteristics.

12. The computer program product of claim 11, wherein tasks of the second subset of tasks are configured to be completed in varying orders.

13. The computer program product of claim 11, wherein the set of tasks is linked with a product suite, a particular first task of the second subset of tasks is linked with setup for a first product of the product suite, and a second particular task of the second subset of tasks is linked with setup for a second product of the product suite.

14. The computer program product of claim 11, wherein the processor-readable instructions comprise processor-readable instructions configured to cause the processor to:

following generating the task list that indicates the second subset of tasks to be completed, receive modifications to the set of characteristics, thereby generating a modified set of characteristics;

analyze the modified set of characteristics;

determine, at least partially based on the modified set of characteristics, a modified first subset of tasks of the task list not requiring user input;

determine, at least partially based on the modified set of characteristics, a modified second subset of tasks of the task list requiring user input; and cause indications of changed, unchanged, deleted and added tasks from the second subset of tasks to the modified second subset of tasks to be presented.

15. The computer program product of claim 11, wherein the processor-readable instructions comprise processor-readable instructions configured to cause the processor to:

determine, for each task of the first subset of tasks and the second subset of tasks, whether the task is in a locked state; and display a lock indicator within the presentation of the task list, for each task in a locked state among the first subset of tasks and the second subset of tasks.

16. A system for setting up software products, the system comprising:

a processor; and a memory communicatively coupled with and readable by the processor and having stored therein a series of processor-readable instructions which, when executed by the processor, cause the processor to:

receive a set of characteristics in response to a questionnaire, wherein the set of characteristics indicates needs of an organization;

analyze the set of characteristics;

determine a task list comprising a set of tasks associated with at least one of setting up, installing, or configuring a set of one or more software products, wherein each task of the task list comprises one or more data gathering setup steps;

determine, based on the received set of characteristics, a first subset of tasks of the task list not requiring user input;

determine, based on the received set of characteristics, a second subset of tasks of the task list requiring user input;

generate the task list for display as part of a single interface that indicates the first subset of tasks, and the second subset of tasks;

determine, for each task of the first subset of tasks and the second subset of tasks, an associated task owner;

cause the task list to be presented such that the task list is subdivided into a plurality of sub-task lists, wherein each task in the plurality of sub-task lists is presented with an associated graphical indication of status;

display the associated task owner within the presentation of the task list, for each task of the first subset of tasks and the second subset of tasks;

in response to receiving a selection of a selectable dependency indication associated with a first task, display task dependency data associated with the first task, the task dependency data comprising:

a third set of tasks on which the first task depends for completion; and a fourth set of tasks that depend on the first task for completion, wherein task dependency data includes, for each of the third set of tasks and the fourth set of tasks, an associated task owner and a task status; and install the set of software products on one or more computer systems, wherein:

during the installation, each task of the first subset of tasks of the task list is completed without further input, based on the received set of characteristics from the questionnaire; and during the installation, each task of the second subset of tasks of the task list requires information that cannot be determined based on the set of characteristics.

17. The system for setting up software products of claim 16, wherein
tasks of the second subset of tasks are configured to be completed in varying orders.

18. The system for setting up software products of claim 16, wherein:
the task list is linked with a product suite,
a particular task of the second subset of tasks is linked with setup for a first product of the product suite, and
a second particular task of the second subset of tasks is linked with setup for a second product of the product suite.

19. The system for setting up software products of claim 16, wherein the processor-readable instructions comprise processor-readable instructions configured to cause the processor to:
following generating the task list that indicates the second subset of tasks to be completed, receive modifications to the set of characteristics, thereby generating a modified set of characteristics;
analyze the modified set of characteristics;
determine, at least partially based on the modified set of characteristics, a modified first subset of tasks of the task list not requiring user input;
determine, at least partially based on the modified set of characteristics, a modified second subset of tasks of the task list requiring user input; and
cause indications of changed, unchanged, and added tasks from the second subset of tasks to the modified second subset of tasks to be presented to the user.

20. The system for setting up software products of claim 16, wherein the processor-readable instructions comprise processor-readable instructions configured to cause the processor to
determine, for each task of the first subset of tasks and the second subset of tasks, whether the task is in a locked state; and
display a lock indicator within the presentation of the task list, for each task in a locked state among the first subset of tasks and the second subset of tasks.

* * * * *